Feb. 5, 1963 — O. E. E. STROMBERG — 3,076,314
AUXILIARY CONTROL FOR AUTOMOBILE BRAKES
Filed June 15, 1959 — 2 Sheets-Sheet 1

INVENTOR.
Olof E. E. Stromberg,
BY Parker & Carter
Attorneys.

United States Patent Office 3,076,314
Patented Feb. 5, 1963

3,076,314
AUXILIARY CONTROL FOR AUTOMOBILE BRAKES
Olof E. E. Stromberg, 5453 Northwest Highway, Chicago, Ill.
Filed June 15, 1959, Ser. No. 820,193
1 Claim. (Cl. 60—54.5)

My invention relates to improvements in auxiliary control for automobile brakes and has for one object to provide an auxiliary control which as an integral unit can be connected into a hydraulic pressure line.

Another object is to provide a package control mechanism which may be cut into a hydraulic pressure line at any desired point.

Another object is to provide such an auxiliary control mechanism as can be mounted in an automobile body at any point, on the floor-board, the fire wall or anywhere else by merely coupling it into the hydraulic line and bolting or screwing the unit in place.

Other objects will appear from time to time throughout the specification and claim.

The invention is illustrated more or less diagrammatically in the accompanying drawings, wherein—

Like parts are indicated by like characters throughout the specification and drawings.

Figure 1:
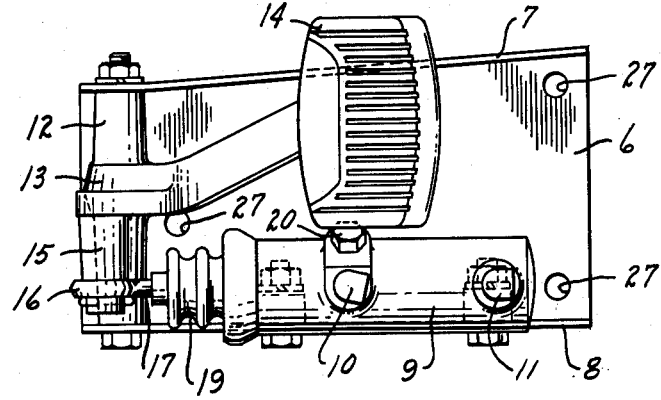
FIGURE 1 is a plan view of the unit.
Figure 2:
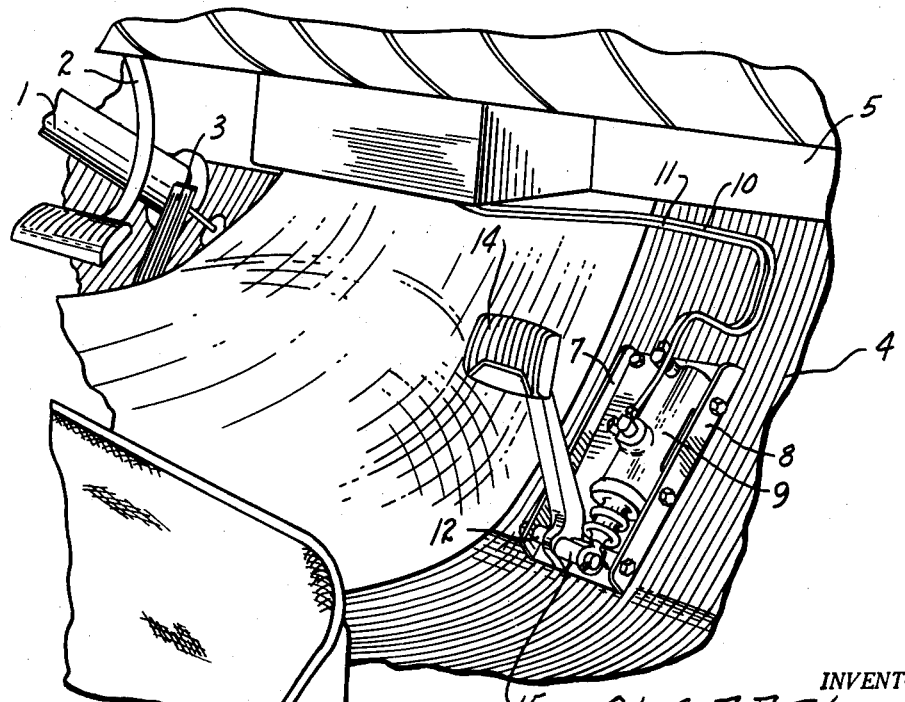
FIGURE 2 is a perspective of the interior of an automobile showing one of the many positions the unit may assume.
Figure 3:
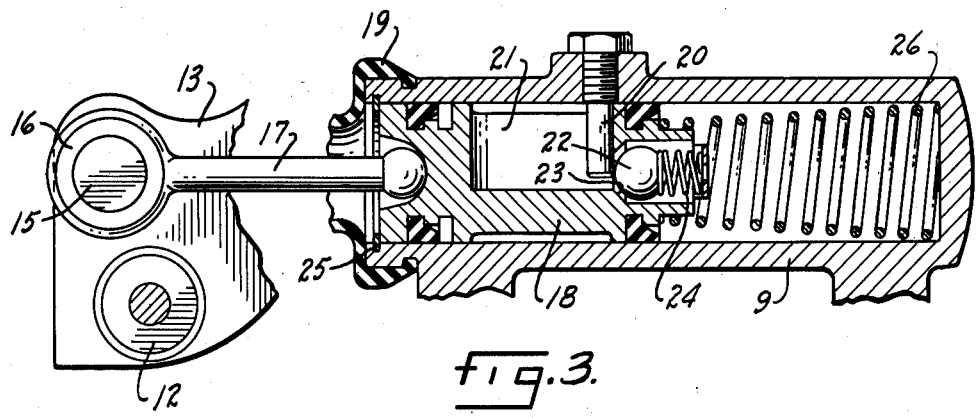
FIGURE 3 is a longitudinal section through the cylinder.
Figure 4:
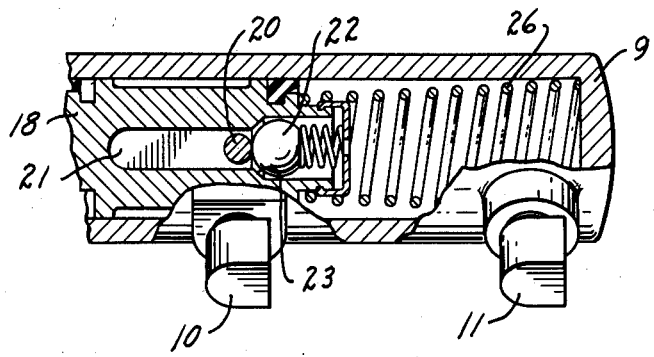
FIGURE 4 is a detail section similar to FIGURE 3 in a different position.

I have illustrated the device as actuated by a foot pedal but it might equally well be actuated by a hand lever, or even by other means.

The usual automobile steering column 1, brake lever 2, throttle pedal 3 are on the left hand side of the driver's compartment, all behind and above the inclined floor or foot board 4. The unit itself is shown bolted to the floor 4 though it might equally well be on the fire wall 5, or in any other desired position on the vehicle.

The unit package comprises a metal plate 6 upwardly flanged on both sides at 7, 8. Bolted to the plate is the pressure cylinder 9 adapted to be connected by means of ducts 10, 11, preferably in series, though under some circumstances perhaps in parallel, with the hydraulic automobile braking system. If in series, no reserve supply of hydraulic fluid need be provided because the usual brake cylinder not shown, is so equipped. If in parallel, then there will be added somewhere in the line additional fluid supply to take care of the usual exigencies of brake operation and maintenance.

Supported between the flanges 7 and 8 is a pivot pin 12 on which is rotatably mounted a lever 13 terminating in a pedal piece 14. Extending laterally from the lever 13 is an eccentric or crank pin 15 on which is rotatably mounted the yoke 16 on the end of the push rod 17, which latter abuts on the piston 18. A bellows seal 19 protects the push rod and piston end from dust and dirt.

Rotation of the lever 13 in the forward direction moves the piston forwardly to exert a pressure on the hydraulic line to apply the brakes independent of the effect of the brake lever 2. Suitable means are provided to permit free flow of fluid through the cylinder 9 when the lever is in its rearward position so that brakes may be applied by the brake pedal 2 without interference by the auxiliary unit.

The piston 18 reciprocates in the cylinder, is biased toward the open end of the cylinder by the spring 26. A pin 20 extending inwardly from the wall of the cylinder engages a slot 21 in the piston to unseat the ball valve 22 from the valve seat 23 in the piston when the piston is in the retracted position. A valve spring 24 biases the ball toward the valve seat when the piston moves toward the pressurized position away from the pin 20. The snap ring 25 in the open end of the piston positively limits the retracting movement of the piston.

On the other hand, when the lever 13 is rotated in the forward direction, it moves a piston in the cylinder forwardly to seat a valve and thus to cut off hydraulic connection to the brake pedal 2 and at the same time apply pressure in the brake line independent of the pressure applied to brake pedal 2. This piston and valve mechanism is illustrated in my co-pending application Serial No. 713,197. By this arrangement, there may be placed in an automotive vehicle or in any other situation where hydraulic pressures are generated by a normally operative pressure source, my auxiliary package mechanism which preferably may be connected in series in the hydraulic line without in any way interfering with the flow of pressure from the normal pressure source to the point at which pressure is to be applied. At the same time, however, when my auxiliary mechanism is manipulated, it will apply pressure quite independent of the normal pressure applying means to the same point while still leaving it possible for the normal pressure operating means to take over if the pressure generated by the normal pressure producing element is greater than that produced by my auxiliary package.

My control may be applied on the right hand side of an automobile so that the rural free delivery man may slide over to the right hand side of his car to make deliveries without losing control of his vehicle or it may be in the back portion of the vehicle so that the passenger on the rear seat may apply the brakes if he so desires.

Since the cylinder 9 contains a piston which will apply pressure and since that cylinder is connected to the hydraulic brake line, the braking effect resulting from pressure on the lever is just as much under the control of the operator who applies that pressure as is the usual automobile brake pressure.

The important factor of the present invention is that it is portable in the sense that it can be put anywhere and it can be mounted anywhere without assembly or disassembly. All that is necessary is to fasten it at some convenient place and connect it up to the line. The plate is apertured for fastening and those apertures as shown at 27 are out of register with plate or lever so that attachment can be easily made.

I claim:

An automobile hydraulic brake system, said brake system including a single conventional master cylinder, a plurality of brakes, a hydraulic line between the brakes and master cylinder, and an auxiliary brake cylinder assembly for increasing pressure, under certain conditions, to the brakes independently of master cylinder generated pressure, said auxiliary brake cylinder assembly including an auxiliary brake cylinder connected in series into the hydraulic line between the master cylinder and the brakes at any pre-selected position therebetween, said auxiliary cylinder having an inlet and outlet which, when connected to the hydraulic line, provide a hydraulic fluid flow path therebetween, a piston in slidable contact with and reciprocable in the auxiliary cylinder, a stop for limiting the outward excursion of the piston on its return stroke as it moves to a retracted position, the hydraulic fluid flow path being normally open when the piston is in its retracted position to thereby permit unobstructed flow of hydraulic fluid from the master cylinder to the brakes, spring means normally urging the piston outwardly toward the stop, seal means for preventing escape of hydraulic fluid outwardly from the auxiliary cylinder, valve means carried by the piston, said valve means being constructed and arranged to shut off the hydraulic fluid flow path between the inlet and the master cylinder when the piston moves in an inwardly brake applying, extending direction and the outlet pressure exceeds the inlet pressure, and a mechanical linkage for urging the piston inwardly against the biasing force of the spring to thereby shut the valve means and close the fluid flow path between the inlet and outlet, said mechanical linkage including a foot pedal pivoted about a fixed support, said fixed support including a mounting plate, said mounting plate being substantially longer than it is wide, the long sides of the mounting plate terminating in flanges disposed substantially perpendicularly to the plane of the plate, the width of the flanges being substantially less than the width of the plate, said auxiliary brake cylinder being secured to one of said flanges between the flanges, said plate having a plurality of apertures therein for connecting the unit to a mounting base, the foot pedal being rotatable about the pivot pin, said foot pedal being offset along the pivot pin from the auxiliary brake cylinder when a brake applying force is applied to the lever structure, and an actuating member pivotally connected at one end to the lever structure at a position eccentrically offset from the pivot pin, the other end of the actuating member extending to the auxiliary brake cylinder and being operable, when a force is applied to the lever, to actuate said auxiliary brake cylinder.

References Cited in the file of this patent

UNITED STATES PATENTS

| | | |
|---|---|---|
| 315,840 | Roberts | Apr. 14, 1885 |
| 1,183,764 | Pfouts | May 16, 1916 |
| 2,141,358 | Meeks | Dec. 27, 1938 |
| 2,168,719 | Staude | Aug. 8, 1939 |
| 2,299,979 | Hammond | Oct. 27, 1942 |
| 2,356,517 | Hale | Aug. 22, 1944 |
| 2,389,962 | Dougherty | Nov. 27, 1945 |
| 2,556,288 | Milster | June 12, 1951 |
| 2,704,585 | Stromberg | Mar. 22, 1955 |
| 2,765,055 | Bloomfield | Oct. 2, 1956 |
| 2,844,940 | Huber | July 29, 1958 |
| 2,870,607 | Voigt | Jan. 27, 1959 |
| 2,873,724 | Olnhausen | Feb. 17, 1959 |

FOREIGN PATENTS

| | | |
|---|---|---|
| 941,466 | France | July 19, 1948 |
| 589,583 | Germany | Dec. 11, 1933 |